United States Patent [19]

Tocker

[11] Patent Number: 4,987,142
[45] Date of Patent: Jan. 22, 1991

[54] FUNGICIDE COMPOSITIONS

[75] Inventor: Stanley Tocker, Wilmington, Del.

[73] Assignee: E. I. du Pont de Nemours and Company, Wilmington, Del.

[21] Appl. No.: 438,509

[22] PCT Filed: Apr. 8, 1989

[86] PCT No.: US88/01065

§ 371 Date: Oct. 3, 1989

§ 102(e) Date: Oct. 3, 1989

[87] PCT Pub. No.: WO88/07813

PCT Pub. Date: Apr. 8, 1988

[22] Filed: Oct. 3, 1989

[51] Int. Cl.$^5$ .................... A01N 43/64; C07D 233/54
[52] U.S. Cl. ...................................... 514/383; 548/341
[58] Field of Search ................. 514/383; 548/262, 341

[56] References Cited

U.S. PATENT DOCUMENTS

| | | | |
|---|---|---|---|
| 3,723,622 | 3/1973 | Büchel et al. | 514/383 |
| 3,912,752 | 10/1975 | Meiser et al. | 548/268.2 |
| 3,952,002 | 4/1976 | Kramer et al. | 548/268.2 |
| 4,053,616 | 11/1977 | Büchel et al. | 514/383 |
| 4,079,062 | 3/1978 | Van Reet et al. | 548/268.8 |
| 4,154,945 | 5/1979 | Brookes et al. | 548/341 |
| 4,255,434 | 3/1981 | Krämer et al. | 514/383 |
| 4,284,639 | 8/1981 | Krämer et al. | 514/383 |
| 4,348,385 | 9/1982 | Synek | 514/80 |
| 4,394,151 | 7/1983 | de Fraine et al. | 71/76 |
| 4,510,136 | 4/1985 | Moberg | 514/63 |

FOREIGN PATENT DOCUMENTS

| | | |
|---|---|---|
| 125471 | 11/1984 | European Pat. Off. . |
| 158374 | 10/1985 | European Pat. Off. . |
| 2095109 | 9/1982 | United Kingdom . |

OTHER PUBLICATIONS

Kirk-Othmer, Encyclopedia of Chemical Technology, vol. 22, pp. 502–503 (1970).

*Primary Examiner*—Stanley J. Friedman
*Assistant Examiner*—Kevin Weddington
*Attorney, Agent, or Firm*—Samuel S. Blight

[57] ABSTRACT

Compositions of azole fungicides exhibiting reduced eye irritation are prepared by replacing a significant portion of the hydrocarbon solvent with a combination of propylene glycol and a long chain fatty alcohol.

29 Claims, No Drawings

FUNGICIDE COMPOSITIONS

BACKGROUND OF THE INVENTION

1. Field of the Invention

The present invention is directed to the preparation of fungicide concentrates and, more particularly, to the replacement of a significant portion of aromatic hydrocarbons, e.g., xylene which have been employed in such concentrates with a combination of propylene glycol and a long chain fatty alcohol to reduce the potential of eye irritation when using the concentrate.

2. Description of Related Art

U.S. Pat. No. 4,348,385 issued on Sept. 7, 1982 discloses water dispersible pesticide suspensions which are stabilized with a solid ionic dispersant. The use of propylene glycol is discussed but the compositions of the present invention are not suggested.

European patent application No. 125,471 published on Nov. 21, 1984 discloses a solvent such as propylene glycol and the use of fatty alcohols and a surfactant as a foaming agent for the delivery of pesticidal compounds but does not disclose or suggest the present invention.

SUMMARY OF THE INVENTION

The present invention are compositions containing an azole fungicide having reduced eye irritation comprising or consisting essentially of, in percent by weight based on the weight of the composition. 5-50% of an azole fungicide which irritates the eye in combination with a hydrocarbon such as xylene. 20-40% propylene glycol. 1-20% fatty alcohol having at least 10 carbon atoms. 10-40% surfactant and less than about 20% aromatic hydrocarbons such as xylene.

A particular group of fungicides to which the present invention is applicable are those having the formula

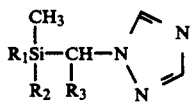

wherein
$R_1$ and $R_2$ are independently phenyl optionally substituted by halogen:
$R_3$ is H or $CH_3$.

Specific fungicides to which the present invention is particularly applicable are as follows:
1. 1-[[Bis(4-fluorophenyl)methylsilyl]methyl]-1H-1,2,4-triazole (flusilazol)
2. β-([1,1'-biphenyl]-4-yloxy)-α-1,1-dimethylethyl-1 H-1,2,4-triazole-1-ethanol(bitertanol)
3. 1-(4-chlorophenoxy)-3,3-dimethyl-1-(1H-1,2,4-triazol-1-yl)-2-butanone (triadimefon)
4. β-(4-chlorophenoxy)-α-(1,1-dimethylethyl)-1H-1,2,4-triazole-1-ethanol (triadimenol)
5. (RS)-2,4'-difluoro-α-(1H-1,2,4-triazol-1-ylmethyl)-benzhydryl alcohol (flutriafol)
6. 1-[2-(2,4-dichlorophenyl)-4-propyl-1,3-dioxolan-2-ylmethyl]-1H-1,2,4-triazole
7. 1-(N-propyl-N-(2-(2,4,6-(trichlorophenoxy)-ethyl)-carbomoyl)imidazole(prochloraz)
8. (RS)-2-(2,4-dichlorophenyl)-1-(1H-1,2,4-triazol-1-yl)hexan-2-ol
9. β-[(2,4-dichlorophenyl)-methylene]-α-(1,1-dimethylethyl)-1,2,4-triazole-1-ethanol
10. (5RS.6RS)-6-hydroxy-2,2,7,7-tetramethyl-5-(1,2,4-triazol-1-yl)octan-3-one
11. (RS)-1-(4-chlorophenyl)-4,4-dimethyl-3-(1H-1,2,4-triazol-1-ylmethyl)pentan-3-ol
12. (2RS.3RS)-2-(R-chlorophenyl)-3-cyclopropyl-1-(1 H-1,2,4-triazol-1-yl)butan-2-ol Examples of specific compositions are those containing in percent by weight based upon the total weight of the composition:
5-50, preferably 10-50, more preferably 20-50. Most preferably 20-40% fungicide
≦20, preferably ≦10% aromatic hydrocarbon (e.g. xylene)
20-40, preferably 25-35% propylene glycol
1-20, preferably 5-15% 1-octadecanol or 1-dodecanol
10-40, preferably 10-25% surfactant.

DETAILED DESCRIPTION OF THE INVENTION

Aromatic hydrocarbons are widely used in emulsifiable concentrates containing chemicals for agricultural applications. Xylenes are among the most popular of these. Unfortunately, xylene alone can be hazardous to eye tissue at a level of only 200 parts per million, according to *Dangerous Properties of Industrial Materials,* 6th edition. N. I. Sax (Van Nostrand and Reinhold Co.).

Surfactants which are frequently included in emulsifiable concentrates for promoting dispersion of the active fungicidal material in water before application can intensify irritation.

While xylene and related aromatic hydrocarbons can be deleterious to mammalian eyes in the absence of adequate precautions, small quantities, e.g., under 10%, in agrichemical formulations are far less deleterious than the higher concentrations normally required in emulsifiable concentrates to impart satisfactory dispersibility. However, the desirable properties of the compositions deteriorate as the amount of hydrocarbon is reduced and special considerations have been found necessary to retain the desirable properties.

A critical compound which permits such a reduction in the amount of hydrocarbon while retaining the properties imparted to the composition by it, is propylene glycol. Propylene glycol has an unmarched combination of properties for preparing eye-safe, water dispersible liquid formulations. It is an excellent solvent for flusilazol and other azole fungicides, surfactants and other adjuvants. Moreover, this solvent has relatively low eye irritation compared with other relatively available aromatic liquids, low molecular weight alcohols and ketones. This glycol, which should be present at a concentration in the range 20-40, preferably 25-35% by weight based upon the weight of the concentrate, upon addition of the concentrate to water rapidly migrates into the water, leaving behind an aqueous dispersion of microdroplets of fungicide in either essentially pure state or containing a small amount of xylene.

When the fungicide is normally a solid under ambient conditions, as is the case of flusilazol, the droplets can crystallize, leading to sedimentation. Under these conditions, the user is likely to have severe problems during the spraying of the dispersion, such as uneven application caused by plugging of spray nozzles resulting in crop damage or ineffective dose rates. It has been discovered that this problem of sedimentation can be alleviated by the use of long chain fatty alcohols which, surprisingly, are outstanding inhibitors of crystallization. Examples of alcohols are 1-dodecanol, 1-decanol, 1-undecanol, 1-tridecanol, 1-tetradecanol, 1-pentadecanol, 1-hexadecanol, 1-heptadecanol, or 1-octadecanol. Incorporation of such alcohols, the most effective of which is 1-dodecanol in concentrations of 1–20%, preferably 5–15% by weight based on the weight of the concentrate greatly improved the stability of the aqueous dispersions without reducing eye safety.

The combination of the propylene glycol and the alcohol is necessary to achieve the reduction in the quantity of hydrocarbon media.

In addition, it is preferred to employ surfactants in the compositions of the present invention to provide good dispersibility of the fungicide in water. Polyoxyethylene sorbitan monooleate (Tween ®80, ICI, Inc.), polyoxyethylene sorbitan monolaurate (Tween ®20, I.C.I., Inc.) and octyl phenoxy polyethoxy ethanol (Triton ®X-102, Rohm and Haas Co.) used in combination with a commercial nonionic/anionic surfactant blend, e.g., oil soluble sulfonates containing ethoxylated alcohols or polyethoxylated glycerides is especially effective. Examples of the blends are Flomo ®2X (Sellers Chemical Corp.), Atlox ®3403F (I.C.I., Inc.) and Sponto 150TH (Witco Chemical Co.). The concentration of surfactant in the formulations should be between 10–40 and, preferably 10–25% by weight based on the weight of the concentrate, depending on the amount of fungicide used and the degree of dispersibility required. In general, surfactants used should have an HLB above 13 and be soluble in the propylene glycol solution of the fungicide.

The present invention is applicable to any azole fungicide which in combination with aromatic hydrocarbons, especially xylene, can cause eye irritation when improperly handled. A particular group of fungicides to which the present invention is applicable are those having the formula

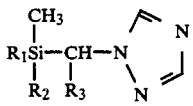

wherein $R_1$ and $R_2$ are independently phenyl and phenyl substituted by a halogen and $R_3$ is H or $CH_3$.

Additional operable azole fungicides are described by T. Kato, W. Kramer, K.-H. Kuck, D. M. Norris and H. Schoinpflug, "Sterol Biosynthesis Inhibitors and Anti-Feeding Compounds," Springer Verlag, New York, 1986 and L. Zirngibl, Progress in Drug Research, 27, 253–383 (1983).

Families of operable fungicides are represented by 1-[[Bis(4-fluorophenyl)methylsilyl]methyl]-1H-1,2,4-triazole (flusilazol), disclosed in U.S. 4,510,136; by β-([1,1'-biphenyl]-4-yloxy)-α-1,1-dimethylethyl-1 H-1,2,4-triazole-1-ethanol(bitertanol). disclosed in U.S. Pat. No. 3,952,002; by 1-(4-chlorophenoxy)-3,3-dimethyl-1-(1H-1,2,4-triazol-1-yl)-2-butanone (triadimefon), disclosed in U.S. Pat. No. 3,912,752; by β-(4-chlorophenoxy)-α-(1,1-dimethylethyl)-1H-1,2,4-triazole-1-ethanol (triadimenol), disclosed in U.S. Pat. No. 3,952,002; by (RS)-2,4'-difluoro-α-(1H-1,2,4-triazol-1-ylmethyl)-benzhydryl alcohol (flutriafol), disclosed in EP-A-15,756; by 1-[2-(2,4-dichlorophenyl)-4-propyl-1,3-dioxolan-2-ylmethyl]-1H-1,2,4-triazole, disclosed in U.S. Pat. No. 4,079,062; and by 1-(N-propyl-N-(2-(2,4,6-(trichlorophenoxy)-ethyl)carbamoyl)imidazole(prochloraz), disclosed in U.S. Pat. No. 4,154,945.

The following examples are presented to illustrate but not to restrict the present invention. Part and percentages are by weight unless otherwise specified. The compositions were prepared by mixing the ingredients together in a suitable vessel until complete dissolution of all components occurred. Optionally, heating can be used to accelerate the formation of the solution. The formulations were evaluated by the EPA rabbit eye irritation test which involves introducing a 0.1 mL aliquot of the formulation to be tested in the lower conjunctival sac of the left eyes of six New Zealand white rabbits. The right eyes serve as controls. The rabbits were examined for evidence of eye irritation at various intervals after treatment.

Generally, rabbits treated with flusilazol formulations containing over 40% xylene as the only solvent showed moderate corneal opacification after 21 days. Some formulations of the present invention showed mild irritation, but the effects were reversible and in most cases eye irritation subsided in under seven days, usually in 48 hours.

EXAMPLE I

| Ingredient | Amount in Percent by Weight Based Upon Total Weight of Composition |
| --- | --- |
| Flusilazol (83% technical) | 40.7 |
| Tween ®80 (polyoxyethylene sorbitan monooleate) | 11.0 |
| Flomo ®2x (nonionic/anionic surfactant) | 5.0 |
| 1-Dodecanol | 5.0 |
| Propylene Glycol | 30.0 |
| Xylene | 8.3 |

This light-amber liquid, containing 40% active flusilazol, readily dispersed in water to provide a able suspension. No crystallization of fungicide was observed after standing 24 hours at 18°–22° C.

The rabbit eye test was performed with this formulation. Slight corneal opacity and other signs of eye irritation occurred, but all eyes were normal after 48 hours.

EXAMPLE II

Following the procedure of Example I the following composition was prepared and tested.

| Ingredient | Amount in Percent by Weight Based Upon Total Weight of Composition |
| --- | --- |
| Flusilazol | 40.7 |
| Tween ®80 (polyoxyethylene sorbitan monooleate) | 20.0 |
| 1-Dodecanol | 5.0 |
| Propylene Glycol | 26.0 |
| Xylene | 8.3 |

The formulation dispersed in water and no crystallization or settling was observed.

The composition caused mild conjunctivitis in the rabbit eye test. However, all eyes were normal two days after treatment.

Similar results are achieved when 1-Octadecanol is substituted for 1-Dodecanol.

EXAMPLE III

Following the procedure of Example I the following composition was prepared.

| Ingredient | Amount in Percent by Weight Based Upon Total Weight of Composition |
|---|---|
| Flusilazol | 25.0 |
| Tween ®80 (polyoxyethylene sorbitan monooleate) | 25.0 |
| 1-Dodecanol | 12.5 |
| Propylene Glycol | 20.6 |
| Atlox ®3403F (nonionic/anionic surfactant) | 10.6 |
| Soybean Oil | 6.3 |
| Xylene | 0.0 |

This information instantly dispersed in water to give a nearly transparent mixture. No crystallization or settling was observed after one week at 18°–22° C.

What is claimed is:

1. A fungicide composition having reduced eye irritation comprising in percent by weight based on the weight of the composition 5–50% of an azole fungicide which irritates the eye in combination with an aromatic hydrocarbon, 20–40% propylene glycol, 1–20% fatty alcohol having at least 10 carbon atoms, 10–40% surfactant and less than about 20% aromatic hydrocarbon.

2. The composition of claim 1 wherein the fungicide is 10–50% by weight based on the weight of the composition.

3. The composition of claim 1 wherein the fungicide is 20–50% by weight based on the weight of the composition.

4. The composition of claim 1 wherein the fatty alcohol is a straight chain alcohol having 12 to 18 carbon atoms.

5. The composition of claim 4 wherein the aromatic hydrocarbon is xylene which is present at a concentration of less than 10%.

6. The composition of claim 4 wherein essentially no xylene is present.

7. The composition of claim 4 wherein the fatty alcohol is selected from dodecanol, octadecanol and mixtures thereof at a concentration of 5–15% by weight based upon the weight of the composition.

8. The composition of claim 1 wherein the surfactant is selected from the group consisting of nonionic surfactants, ionic surfactants and mixtures of the foregoing.

9. The composition of claim 8 wherein the surfactant is polyoxyethylene sorbitan monooleate, ethoxylate alcohols, polyethoxylated glycerides and mixtures of the foregoing.

10. The composition of claim 7 wherein the surfactant is polyoxyethylene sorbitan monooleate, ethoxylated alcohols, polyethoxylated glycerides and mixtures of the foregoing.

11. The composition of claim 6 wherein the surfactant is polyoxyethylene sorbitan monooleate, ethoxylated alcohols, polyethoxylated glycerides and mixtures of the foregoing.

12. The composition of claim 3 which contains in percent based upon the total weight of the composition:
20–40% fungicide
≦10% xylene
25–35% propylene glycol
5–15% octadecanol or dodecanol
10–25% surfactant.

13. The composition of claim 1 wherein the fungicide is selected from the group consisting of 1-[[Bis(4-fluorophenyl)methylsilyl]methyl]-1H-1,2,4-triazole, β-([1,1'-biphenyl]-4-yloxy)-α-1,1-dimethylethyl-1H-1,2,4,-triazole-1-ethanol, 1-(4-chlorophenoxy)-3,3-dimethyl-1-(1H-1,2,4-triazol-1-yl)-2-butanone, β-(4-chlorophenoxy)-α-(1,1-dimethylethyl)-1H-1,2,4-triazole-1-ethanol, (RS)-2,4'-difluoro-α-(1H-1,2,4-triazol-1-ylmethyl)benzhydryl alcohol, 1-[2-(2,4-dichlorophenyl)-4-propyl-1,3-dioxolan-2-ylmethyl]-1H-1,2,4-triazole, 1-(N-propyl-N-(2-(2,4,6-(trichlorophenoxy)ethyl)carbamoyl)imidazole, (RS)-2-(2,4-dichlorophenyl(-1-(1H-1,2,4-triazol-1-yl)hexan-2-ol, β-[(2,4-dichlorophenyl)-methylene]-α-(1,1,-dimethylethyl)-1,2,4-triazole-1-ethanol, (5RS,6RS)-6-hydroxy-2,2,7,7-tetramethyl-5-(1,2,4-triazol-1-yl)octan-3-one, (RS)-1-(4-chlorophenyl)-4,4-dimethyl-3-(1H-1,2,4-triazol-1-ylmethyl)pentan-3-ol, (2RS,3RS)-2-(R-chlorophenyl)-3-cyclopropyl-1-(1H-1,2,4-triazol-1-yl)butan-2-ol and mixtures of the foregoing.

14. The composition of claim 1 wherein the fungicide is 1-[[Bis(4-fluorophenyl)methylsilyl]methyl]-1H-1,2,4-triazole.

15. The composition of claim 3 wherein the fungicide is 1-[[Bis(4-fluorophenyl)methylsilyl]methyl]-1H-1,2,4-triazole.

16. The composition of claim 7 wherein the fungicide is 1-[[Bis(4-fluorophenyl)methylsilyl]methyl]-1H-1,2,4-triazole.

17. The composition of claim 9 wherein the fungicide is 1-[[Bis(4-fluorophenyl)methylsilyl]methyl]-1H-1,2,4-triazole.

18. The composition of claim 10 wherein the fungicide is 1-[[Bis(4-fluorophenyl)methylsilyl]methyl]-1H-1,2,4-triazole.

19. The composition of claim 1 wherein the fungicide is β-([1,1'-biphenyl]-4-yloxy)-α-1,1-dimethyl-ethyl-1H-1,2,4-triazole-1-ethanol.

20. The composition of claim 1 wherein the fungicide is 1-(4-chlorophenoxy)-3,3-dimethyl-1-(1H-1,2,4-triazole-1-yl)-2-butanone.

21. The composition of claim 1 wherein the fungicide is β-(4-chlorophenoxy)-α-(1,1-dimethylethyl)-1H-1,2,4-triazole-1-ethanol.

22. The composition of claim 1 wherein the fungicide is (RS)-2,4'-difluoro-α-(1H-1,2,4-triazol-1-ylmethyl)-benzhydryl alcohol.

23. The composition of claim 1 wherein the fungicide is 1-[2-(2,4-dichlorophenyl)-4-propyl-1,3-dioxolan-2-ylmethyl]-1H-1,2,4-triazole.

24. The composition of claim 1 wherein the fungicide is 1-(N-propyl-N-(2-(2,4,6-trichlorophenoxy)ethyl)carbamoyl)imidazole.

25. The composition of claim 1 wherein the fungicide is (RS)-2-(2,4-dichlorophenyl)-1-(1H-1,2,4-triazol-1-yl)hexan-2-ol.

26. The composition of claim 1 wherein the fungicide is β-[(2,4-dichlorophenyl)-methylene]-α-(1,1- dimethylethyl)-1,2,4-triazole-1-ethanol.

27. The composition of claim 1 wherein the fungicide is (5RS,6RS)-6-hydroxy-2,2,7,7-tetramethyl-5-(1,2,4-triazol-1-yl)octan-3-one.

28. The composition of claim 1 wherein the fungicide is (RS)-1-(4-chlorophenyl)-4,4-dimethyl-3-(1H-1,2,4-triazol-1-ylmethyl)pentan-3-ol.

29. The composition of claim 1 wherein the fungicide is (2RS,3RS)-2-(R-chlorophenyl)-3-cyclopropyl-1-(1H-1,2,4-triazol-1-yl)butan-2-ol.

* * * * *